United States Patent [19]

Derossi

[11] 4,327,363

[45] Apr. 27, 1982

[54] SYSTEM FOR TRANSMITTING HEADING INFORMATION FROM A COMPASS TO SEVERAL FOLLOWERS

[76] Inventor: Piero M. Derossi, Corso Giovanni Lanza 55, Turin, Italy

[21] Appl. No.: 168,462

[22] Filed: Jul. 10, 1980

Related U.S. Application Data

[63] Continuation-in-part of Ser. No. 973,807, Dec. 28, 1978, abandoned.

[30] Foreign Application Priority Data

Dec. 30, 1977 [IT] Italy .................... 69955 A/77

[51] Int. Cl.³ .................... G05B 11/12; G08C 19/06
[52] U.S. Cl. .................... 340/870.34; 33/363 R; 318/690
[58] Field of Search .............. 33/363 R; 340/870.34, 340/347 SY; 318/605, 625, 648, 654, 660, 692

[56] References Cited

U.S. PATENT DOCUMENTS 2,418,193  4/1947  Peterson ..................... 318/690
3,564,381  2/1971  Parfomak et al. .......... 340/870.34

Primary Examiner—Thomas A. Robinson
Attorney, Agent, or Firm—Montague & Ross

[57] ABSTRACT

A synchro transmitter having a rotor driven by a compass communicates the heading information from that compass to a plurality of loads via respective synchro receivers whose rotors are energized with direct current or carry permanent magnets and whose stators are supplied with a triad of d-c signals from three modular units each having one input connected to an output lead of a respective stator winding of the transmitter and another input connected in parallel with a winding on the transmitter rotor to a source of alternating current. A demodulator in each unit compares the current of the respective output lead with the reference current from the a-c source and feeds the result to an integrating operational amplifier which emits the corresponding d-c signal.

9 Claims, 1 Drawing Figure

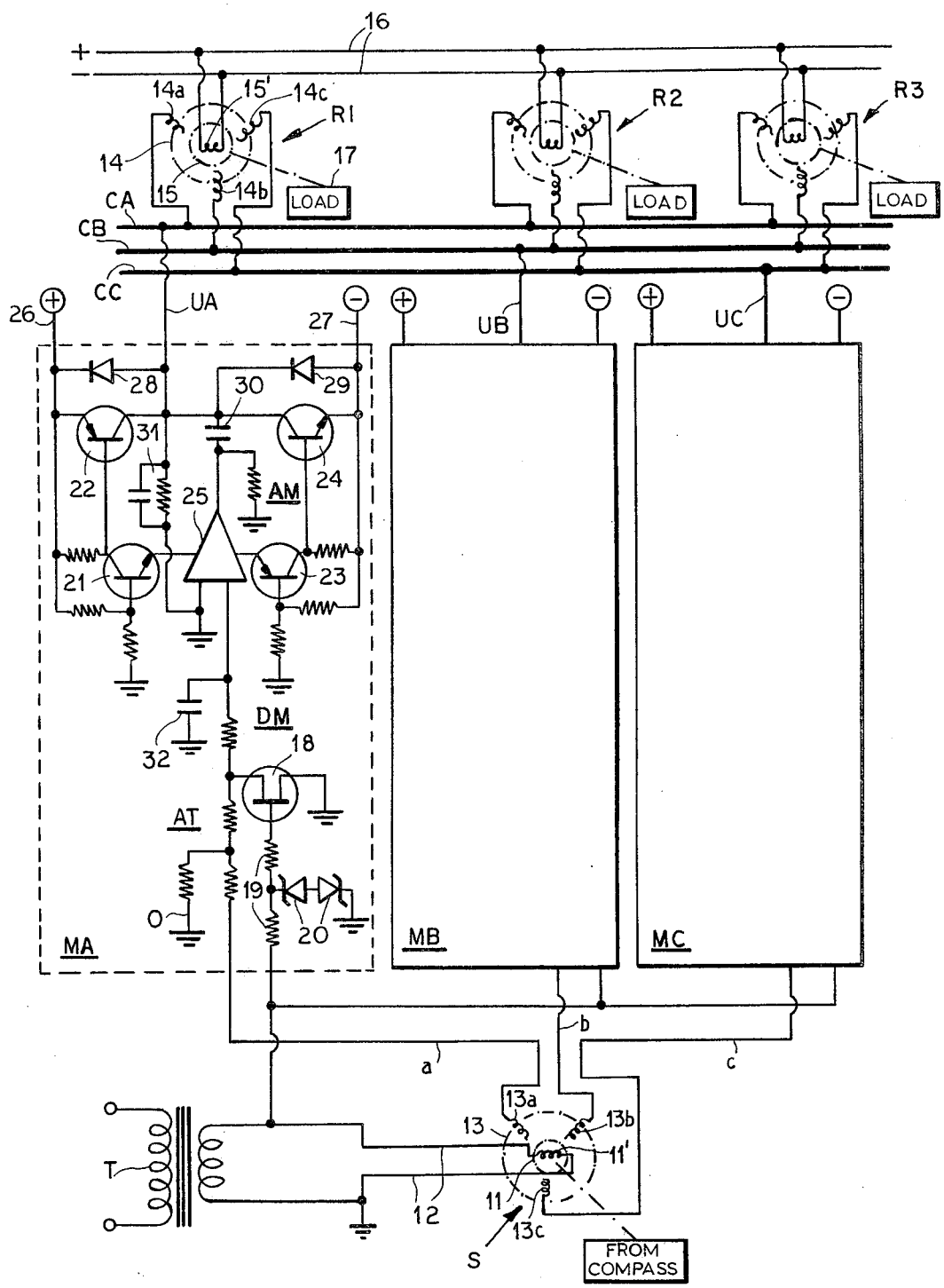

SYSTEM FOR TRANSMITTING HEADING INFORMATION FROM A COMPASS TO SEVERAL FOLLOWERS

CROSS-REFERENCE TO RELATED APPLICATION

This is a continuation-in-part of my copending application Ser. No. 973,807 filed Dec. 28, 1978 and abandoned as of the date of the present application.

FIELD OF THE INVENTION

My present invention relates to a system for the transmission of heading information, generated by a compass which is usually installed in a central position on a craft or the like, to several loads and repeaters installed at various locations more or less remote therefrom.

BACKGROUND OF THE INVENTION

Such transmission is usually effected by coupling to the compass shaft an electromagnetic device of the synchro-transmitter type generating a triad of alternating voltages which, when applied to synchro receivers, drive their shafts and associated followers to repeat the position of the compass shaft, possibly with a given step-up ratio.

A drawback of this system consists in the fact that, when the repeaters are numerous, it is necessary to employ a synchro transmitter of considerable dimensions, which is expensive and cumbersome and, above all, presents a strong inertia which retards the response of the servo system. Another drawback is that, when the transmitter has been correctly designed for the contemplated number of followers, it is not possible subsequently to add other followers without giving rise to overloads. A particularly serious drawback of the system consists in the existence of a coupling between the master compass and the followers and among the various loads themselves. Therefore the accidental mechanical blocking of a repeater impairs the follower system of the master compass itself and puts all the other repeaters out of service.

OBJECT OF THE INVENTION

The object of my present invention is to eliminate the drawbacks referred to by providing means for the transmission of the heading information from a compass to a plurality of followers wherein the possible blocking of one or more followers does not affect either the behavior of the master compass or the efficiency of the remaining ones and wherein the transmission of the information may be effected with a synchro transmitter of weak power, and therefore of low cost and encumbrance and presenting a reduced inertia, whatever be the number of repeaters or other followers to be served; all that without requiring the use of receivers different from those which are normally employed in such transmission systems.

SUMMARY OF THE INVENTION

In a system according to my invention, a synchro transmitter is electrically coupled to a plurality of synchro receivers via an a-c/d-c converter divided into three substantially identical sections which are preferably designed as modular units. The synchro transmitter is provided with the usual stator member and rotor member, the latter being coupled with a compass for assuming an angular position corresponding to the heading information to be communicated to respective followers driven by the rotor parts of the several synchro receivers. One of the transmitter members, usually the rotor, has a winding connected across a source of single-phase alternating current giving rise to induced currents in three angularly spaced-apart windings of the other member whose conductors extend to respective input connections of the three converter sections. One of the two relatively rotatable parts of each synchro receiver, generally the rotor part, is provided with magnetizing means for setting up a steady magnetic field, as by having a winding connected across a supply of direct current; the other part of each receiver has again three angularly spaced-apart windings whose conductors are respectively connected to outputs of the three converter sections. In the windings of this latter part, therefore, three steady magnetic fields are set up whose resultant coacts with the magnetic field of the other receiver part whereby the rotor of each receiver assumes an angular position corresponding to that of the transmitter rotor.

According to a more particular feature of my invention, each converter section comprises a demodulator stage with a first terminal joined to the single-phase a-c source feeding the synchro transmitter and with a second terminal joined to the converter input. This demodulator stage is advantageously followed by a d-c amplifier stage.

The synchro receivers may be of the usual construction, e.g. of the kind adapted to be energized at 60 Hz, without the need for employing a supplemental static inverter when the on-board network is designed for direct current, e.g. at 24 V.

Between its input connection from the synchro transmitter and the demodulating stage, each converter section is preferably provided with an attenuator serving the double purpose of creating an artificial Y center, as generally the true Y center of the synchro transmitter is not accessible, and of decoupling the synchro transmitter, reducing its electrical load to limit the phase shift of the current.

BRIEF DESCRIPTION OF THE DRAWING

An embodiment of my present invention is schematically represented, partly in block form, in the single FIGURE of the accompanying drawing.

SPECIFIC DESCRIPTION

Reference S indicates a synchro transmitter, of conventional type and of low power, whose rotor 11 has a winding 11' energized with alternating current via a two-wire line 12, e.g. at 26 V, by the secondary of a transformer T whose primary is connected to a supply network, e.g. at 115 V and 400 Hz. Rotor 11 assumes an angular position corresponding to the heading information furnished by a nonillustrated compass. Output leads a, b, c from three windings 13a, 13b, 13c of a stator 13 of synchro transmitter S are respectively connected to three modules MA, MB and MC of an a-c/d-c converter. Only module MA will be described and is diagrammatically represented in detail inasmuch as modules MB and MC are identical with module MA.

In the modular unit MA the corresponding output lead a of the synchro transmitter S is connected to an attenuator circuit AT which realizes the aforestated purpose of creating an artificial Y center 0 (grounded) and of decoupling the synchro transmitter. The a-c signal issuing from the attenuator AT is thus correlated with the phase of the supply current, fed to the rotor of the synchro transmitter, in a demodulator circuit DM emitting a pulsating current whose amplitude is representative of the amplitude of the alternating current induced in the corresponding stator winding 13a of the synchro transmitter. It is suitably power-amplified and rectified in a stage AM, designed to conformity with the power required by the load assembly.

The output UA of the converter module MA, together with the outputs UB and UC of the other modules MB and MC, feeds a three-conductor line CA, CB, CC to which windings 14a, 14b, 14c on the stators of various synchro receivers R1, R2, R3 etc. are connected. These receivers, whose rotors 15 may drive any kind of load or repeater of the indication of the master compass which drives the rotor 11 of synchro transmitter S, are of the usual type; only their energization is effected in a nonconventional way in that three position-indicating d-c voltages are sent to their stators 14 instead of a triad of alternating voltages. Correspondingly, there is also sent to windings 15' of the rotors 15 of the synchro receivers R1, R2, R3 (in lieu of the usual alternating voltage) a d-c voltage, e.g. of 24 V, from a line 16. In this way, as will be understood, the synchro transmitter S (and therefore the compass) controls each synchro receiver R1 etc. (and therefore the corresponding repeater or load 17) without the use of a carrier of 60 Hz or of 400 Hz as is customary in transmission systems of this type.

As more particularly illustrated in the drawing for converter section MA, the attenuator circuit AT comprises a resistive T-network inserted between output lead a and demodulation stage DM, the shunt branch of this network terminating at ground 0 which constitutes a common point for all three sections MA, MB and MC. Stage DM comprises a field-effect transistor 18 having a gate electrode connected to the ungrounded branch of a-c line 12 via a voltage divider 19 whose tap is grounded via a pair of back-to-back Zener diodes 20 limiting the amplitudes of both positive and negative half-cycles fed to the transistor gate. One of the two main electrodes (source and drain) of FET 18 is grounded while the other is connected via network AT to output lead a. Thus, with FET 18 rendered conductive during alternate half-cycles of the a-c source, corresponding half-cycles of the phase current from stator 13 will be shunted to ground while the remaining half-cycles are passed on to amplifier stage AM. Both the polarity and the magnitude of these remaining half-cycles will, of course, depend on the relative position of rotor 11 and stator 13.

The pulsating unipolar current emitted by demodulator DM is smoothed by a bypass condenser 32 on its way to one input of an amplifier 25 in stage AM whose other input is grounded. Stage AM further comprises two complementary transistors 21, 22 connected to a positive bus 26 and two other complementary transistors 23, 24 connected to a negative bus 27. NPN transistor 21 conducts only when the signal emitted by amplifier 25 is negative and, in doing so, turns on its companion PNP transistor 22 so as to connect bus 26 to the output lead UA. Conversely, a positive signal emitted by amplifier 25 renders PNP transistor 23 and NPN transistor 24 conductive whereby output lead UA is connected to negative bus 27. Transistors 22 and 24 are shunted by a pair of diodes 28 and 29 in antiparallel relationship therewith.

A capacitor 30, inserted between amplifier 25 and the junction of lead UA with the collectors of transistors 22 and 24, further reduces residual a-c components conjointly with an RC network 31 inserted between that junction and ground.

Since the receivers R1 etc. operate with direct current, a possible mechanical blocking of any of them does not modify their current absorption and does not retroact on the synchro transmitter S or on the other receivers. Therefore, a localized failure puts out of service only the receiver or receivers directly affected without impairing the operation of the entire installation.

The electric power required by the receivers is furnished entirely by the modules of the a-c/d-c converter, so that the synchro transmitter S coupled to the compass does not need to be adapted to the power supply of the system and may be of small power, hence of low cost and encumbrance and of reduced inertia, advantageous for the response of the follower system of the compass. Furthermore, any subsequent extension of the repeater network is possible by replacing, if necessary, the modules of the transmission device, or the amplifiers forming part thereof, but without any modification of the synchro transmitter and, in general, of the compass assembly.

The single-phase current delivered by transformer T via line 12 to the rotor 11 of synchro transmitter S generates in that rotor an alternating but nonrotating magnetic field with an axis whose orientation depends on the position of the compass coupled therewith. This orientation, in turn, determines the amplitudes of the secondary currents induced by that magnetic field in the three stator windings connected to output leads a, b and c. Upon rectification and amplification of these secondary currents in converter modules MA, MB and MC, direct currents of the same relative magnitudes appear on conductors CA, CB and CC to energize respective windings on stators 14 of receivers R1, R2 and R3. The vector sum of the steady magnetic fields generated by these latter windings produces a resulting field whose orientation varies with that of the field generated by transmitter rotor 11. The rotor 15 of each receiver, having a coil energized with direct current from line 16, also generates a steady magnetic field which tends to align itself with the resulting field of the stator windings whereby this rotor assumes an angular position corresponding to that of transmitter rotor 11.

It will be apparent that the same result could be achieved if rotors 15 of receivers R1 etc. were provided with permanent magnets replacing the coils connected across line 16.

Although it will generally be convenient to provide the three angularly equispaced windings connected to leads a, b, c and CA, CB, CC on the stator parts of transmitter S and receivers R1 etc., the system would also operate if the roles of the stator and the rotor were interchanged on some or all of these units.

I claim:
1. A system for transmitting heading information from a compass to a plurality of followers, comprising:
a synchro transmitter with a stator member and a rotor member, the latter being coupled with a compass for assuming an angular position corresponding to heading information furnished by said compass;
a source of single-phase alternating current connected across a winding on one of said members, the other of said members having three angularly spaced-apart windings;

a-c/d-c conversion means divided into three substantially identical modular units each having an input connection to a respective winding of said other of said members; and a plurality of synchro receivers each having a stator part and a rotor part, one of said parts having three windings respectively connected to outputs of said modular units, the other of said parts being provided with magnetizing means for setting up a steady magnetic field, said followers being respectively coupled with the rotor parts of said synchro receivers.

2. A system as defined in claim 1 wherein each of said modular units comprises a demodulator stage with a first terminal joined to said source of alternating current and a second terminal joined to said input connection.

3. A system as defined in claim 2 wherein said demodulator stage includes a field-effect transistor with a gate electrode constituting said first terminal and another electrode constituting said second terminal.

4. A system as defined in claim 2 or 3 wherein each of said modular units further includes an attenuation circuit linking said second terminal to a common point.

5. A system as defined in claim 2 or 3 wherein each of said modular units further includes a d-c amplifier stage between said demodulator stage and said output connection.

6. A system for transmitting heading information from a compass to a plurality of followers, comprising:
    a synchro transmitter with a stator member and a rotor member, the latter being coupled with a compass for assuming an angular position corresponding to heading information furnished by said compass;
    a source of single-phase alternating current connected across a winding on one of said members, the other of said members having three angularly spaced-apart windings;
    a-c/d-c conversion means divided into three substantially identical sections each having an input connection to a respective winding of said other of said members;
    a plurality of synchro receivers each having a stator part and a rotor part, one of said parts having three windings respectively connected to outputs of said sections, the other of said parts being provided with magnetizing means for setting up a steady magnetic field, said followers being respectively coupled with the rotor parts of said synchro receivers; and
    a demodulator stage in each of said sections including a field-effect transistor with a gate electrode joined to said source of alternating current and with another electrode joined to said input connection.

7. A system for transmitting heading information from a compass to a plurality of followers, comprising:
    a synchro transmitter with a stator member and a rotor member, the latter being coupled with a compass for assuming an angular position corresponding to heading information furnished by said compass;
    a source of single-phase alternating current connected across a winding on one of said members, the other of said members having three angularly spaced-apart windings;
    a-c/d-c conversion means divided into three substantially identical sections each having an input connection to a respective winding of said other of said members;
    a plurality of synchro receivers each having a stator part and a rotor part, one of said parts having three windings respectively connected to outputs of said sections, the other of said parts being provided with magnetizing means for setting up a steady magnetic field, said followers being respectively coupled with the rotor parts of said synchro receivers;
    a demodulator stage in each of said sections with a first terminal joined to said source of alternating current and a second terminal joined to said input connection; and
    an attenuation circuit in each of said sections linking said second terminal to a common point.

8. A system for transmitting heading information from a compass to a plurality of followers, comprising:
    a synchro transmitter with a stator member and a rotor member, the latter being coupled with a compass for assuming an angular position corresponding to heading information furnished by said compass;
    a source of single-phase alternating current connected across a winding on one of said members, the other of said members having three angularly spaced-apart windings;
    a-c/d-c conversion means divided into three substantially identical sections each having an input connection to a respective winding of said other of said members;
    a plurality of synchro receivers each having a stator part and a rotor part, one of said parts having three windings respectively connected to outputs of said sections, the other of said parts being provided with magnetizing means for setting up a steady magnetic field, said followers being respectively coupled with the rotor parts of said synchro receivers;
    a demodulator stage in each of said sections with a first terminal joined to said source of alternating current and a second terminal joined to said input connection; and
    a d-c amplifier stage in each of said sections inserted between said demodulator stage and said output connection.

9. A system as defined in claims 1, 2, 3, 6, 7 or 8 wherein said magnetizing means comprises a winding connected across a source of direct current common to all said synchro receivers.

* * * * *